(12) United States Patent
Koshiol et al.

(10) Patent No.: US 11,447,052 B2
(45) Date of Patent: Sep. 20, 2022

(54) ADJUSTABLE WIDTH CONTROL POD BRACKET ASSEMBLY

(71) Applicant: Caterpillar Paving Products Inc., Brooklyn Park, MN (US)

(72) Inventors: Keith Daniel Koshiol, Ramsey, MN (US); Joel N. Thieschafer, Champlin, MN (US); Michael W. Ries, Andover, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 278 days.

(21) Appl. No.: 16/819,002

(22) Filed: Mar. 13, 2020

(65) Prior Publication Data

US 2021/0284019 A1 Sep. 16, 2021

(51) Int. Cl.
*B60N 2/75* (2018.01)
*B60N 2/02* (2006.01)
*B60N 2/38* (2006.01)
*F16M 13/02* (2006.01)
*E02F 9/16* (2006.01)
*B60K 26/02* (2006.01)
*E02F 9/20* (2006.01)

(52) U.S. Cl.
CPC ............... *B60N 2/777* (2018.02); *B60N 2/02* (2013.01); *B60N 2/38* (2013.01); *E02F 9/16* (2013.01); *F16M 13/022* (2013.01); *B60K 26/02* (2013.01); *B60K 2026/024* (2013.01); *B60K 2026/029* (2013.01); *E02F 9/2004* (2013.01); *F16M 2200/028* (2013.01)

(58) Field of Classification Search
CPC . B60N 2/777; B60N 2/02; B60N 2/38; B60N 2/24; B60N 2/78; B60N 2/797; E02F 9/16; E02F 9/2004; E02F 9/166
See application file for complete search history.

(56) References Cited

U.S. PATENT DOCUMENTS

| 5,338,133 | A | * | 8/1994 | Tornero | .................... A47C 1/03 403/321 |
| 5,586,811 | A | | 12/1996 | Tornero | |
| 5,666,861 | A | * | 9/1997 | Fee | ......................... B60N 2/777 384/57 |
| 5,746,480 | A | * | 5/1998 | Bonutti | .................. A47C 16/00 248/118 |
| 5,839,786 | A | | 11/1998 | Cvek | |
| 6,409,266 | B1 | * | 6/2002 | Chen | ......................... A47C 1/03 297/383 |

(Continued)

*Primary Examiner* — Paul N Dickson
*Assistant Examiner* — Timothy Wilhelm
(74) *Attorney, Agent, or Firm* — von Briesen & Roper, s.c.

(57) ABSTRACT

A control pod bracket assembly for an operator seat of a work machine adjusts a spacing distance between a right control pod and a left control pod. A right side bracket and a left side bracket having the control pods mounted thereon may be slidably coupled to a center bracket to move between inward and outward positions. Right side bracket and left side bracket locking mechanisms are selectively engageable to lock the side brackets at the inward or outward positions, and to unlock and allow the side brackets to move between the inward and outward positions. Adjustment of the side brackets allows the control pod spacing to be varied between a minimum control pod spacing distance and a maximum control pod spacing distance.

17 Claims, 9 Drawing Sheets

(56) References Cited

U.S. PATENT DOCUMENTS

| | | | | |
|---|---|---|---|---|
| 6,572,195 B1* | 6/2003 | Lee | A47C 1/0307 | 297/411.37 |
| 6,646,891 B2* | 11/2003 | Kim | B60N 2/77 | 361/810 |
| 6,971,194 B2* | 12/2005 | McClelland | E02F 9/2004 | 180/326 |
| 7,389,845 B2* | 6/2008 | Longueville | B60N 2/753 | 180/326 |
| 7,438,318 B2* | 10/2008 | Sano | B60N 2/753 | 180/326 |
| 7,458,439 B2* | 12/2008 | Catton | B60N 2/767 | 248/125.8 |
| 7,641,019 B2* | 1/2010 | Pline | B60K 26/02 | 180/315 |
| 7,677,654 B2* | 3/2010 | Enberg | B60N 2/77 | 297/411.32 |
| 7,878,288 B2* | 2/2011 | Kostak | B60N 2/777 | 180/329 |
| 8,002,323 B2* | 8/2011 | Jones | B60R 7/04 | 296/37.1 |
| 8,056,980 B2* | 11/2011 | Koutsky | B60N 2/14 | 297/344.21 |
| 8,226,155 B2 | 7/2012 | Hill et al. | | |
| 8,459,746 B2* | 6/2013 | Lai | A47C 1/0307 | 297/411.27 |
| 8,596,722 B2* | 12/2013 | Haubrich | B60N 2/773 | 297/411.37 |
| 8,651,220 B2* | 2/2014 | Connor | E02F 9/2004 | 180/326 |
| 8,714,049 B2* | 5/2014 | Ast | G05G 1/04 | 74/522 |
| 9,578,971 B2* | 2/2017 | Su | A47C 1/03 | |
| 9,795,220 B1* | 10/2017 | Chen | A47C 1/03 | |
| 10,723,249 B2* | 7/2020 | Dry | B60N 2/753 | |
| 10,786,082 B1* | 9/2020 | Lai | A47C 1/0307 | |
| 11,021,088 B2* | 6/2021 | Ishimizu | B60N 2/773 | |
| 2018/0134196 A1* | 5/2018 | Karcz | B60N 2/777 | |

* cited by examiner

ADJUSTABLE WIDTH CONTROL POD BRACKET ASSEMBLY

TECHNICAL FIELD

The present disclosure relates generally to work machine control systems for a work machine and, more particularly, to a control pod bracket assembly for an operator seat that facilitates adjustment of a width between control pods mounted on either side of the operator seat.

BACKGROUND

Many operator-driven work machines have been developed for performing excavation operations on work surfaces, such as asphalt pavers, backhoe loaders, cold planers, compactors, bulldozers, drills, excavators, material handlers, motor graders, skid steer and wheel loaders, and the like. Generally, these work machines include one or more work implements mounted on a tractor or other machine body that is moveable along the ground on wheels or tracks. Stabilizing legs may also be included to hold the work machine in place while the operator is utilizing the implement.

Modern work machines typically employ a joystick-based control system that controls the movement and position of the work implements. For ergonomic reasons, a joystick or joysticks of the control system may be located at control pods of an operator seat in the operator station of the work machine. Many work machines include dual control pods that each have a joystick extending upward therefrom, and that are disposed on top of vertically oriented arms that are spaced apart on either side of the operator seat. Each control pod may have additional input devices (buttons, switches, etc.) and output devices (display screens, informational or warning lights, gauges, etc.) integrated therein that are helpful or necessary to the operation of the implements and the work machine.

Throughout the useful life of operation of the work machines, operators of different sizes and shapes will operate the implement and work machine controls on the control pods. These operators of various sizes and shapes may require varying seating and control system positions for optimum comfort and effective operation of the work machine and its implements. As a result, consistently comfortable and ergonomic operating positions for each operator for all operating situations are difficult to provide. Further, because an operator often must use both right hand and left hand control pods, and because devices on the control pods may be sensitive to manipulation by the operator, the comfort and ergonomics of the operator's position can directly affect both productivity and safety.

Systems have been developed for adjustment of control pod positions in work machines in the field. For example, U.S. Pat. No. 8,651,220, that issued on Feb. 18, 2014, entitled "Multi-Directionally Adjustable Control Pods," discloses a position-adjustable, dual-pod control system for a machine such as a backhoe loader. The system includes a horizontal cross beam connected to a pair of brackets. The pair of brackets are mounted to the machine by way of a pair of bearings that enables pivotal movement of the cross beam in the fore and aft directions while the cross beam is positioned perpendicularly to the fore and aft direction or the fore-aft centerline of the machine. A bottom end of each pod arm is pivotally coupled to the brackets thereby enabling the pod arms to be pivoted towards or away from the centerline. Each bracket includes a through hole that accommodates a bearing that is mounted to the machine, such as to the floor of the machine.

SUMMARY OF THE DISCLOSURE

In one aspect of the present disclosure, a control pod bracket assembly for an operator seat of a work machine having a right control pod and a left control pod is disclosed. The control pod bracket assembly may include a center bracket, a right side bracket having the right control pod mounted thereon, and a left side bracket having the left control pod mounted thereon. The right side bracket is slidably coupled to the center bracket to move between a right side bracket inward position and a right side bracket outward position, and the left side bracket is slidably coupled to the center bracket to move between a left side bracket inward position and a left side bracket outward position. The control pod bracket assembly further includes a right side bracket locking mechanism that is selectively engageable to lock the right side bracket at the right side bracket inward position or the right side bracket outward position, and to unlock and allow the right side bracket to move between the right side bracket inward position and the right side bracket outward position, and a left side bracket locking mechanism that is selectively engageable to lock the left side bracket at the left side bracket inward position or the left side bracket outward position, and to unlock and allow the left side bracket to move between the left side bracket inward position and the left side bracket outward position. The right control pod and the left control pod may be spaced by a minimum control pod spacing distance when the right side bracket is in the right side bracket inward position and the left side bracket is in the left side bracket inward position, and the right control pod and the left control pod may be spaced by a maximum control pod spacing distance when the right side bracket is in the right side bracket outward position and the left side bracket is in the left side bracket outward position.

In another aspect of the present disclosure, a method for adjusting a control pod spacing distance between a right control pod and a left control pod of an operator seat of a work machine is disclosed. The right control pod and the left control pod are mounted on a right side bracket and a left side bracket, respectively of a control pod bracket assembly, and the right side bracket and the left side bracket are slidably coupled to a center bracket of the control pod bracket assembly. The method may include disengaging a right side bracket locking mechanism and a left side bracket locking mechanism, moving the right side bracket from a right side bracket first position to a right side bracket second position, moving the left side bracket from a left side bracket first position to a left side bracket second position, and engaging the right side bracket locking mechanism and the left side bracket locking mechanism.

In a further aspect of the present disclosure, an operator seat for a work machine is disclosed. The operator seat may include a seat bottom, a right control pod, a left control pod, and a control pod bracket assembly. The control pod bracket assembly may include a center bracket mounted beneath the seat bottom, a right side bracket having the right control pod mounted thereon, and a left side bracket having the left control pod mounted thereon. The right side bracket may be slidably coupled to the center bracket to move between a right side bracket inward position and a right side bracket outward position, and the right control pod may be positioned above and to the right of the seat bottom. The left side bracket may be slidably coupled to the center bracket to move between a left side bracket inward position and a left side bracket outward position, and the left control pod may be positioned above and to the left of the seat bottom. The control pod bracket assembly may further include a right side bracket locking mechanism that may be selectively engageable to lock the right side bracket at the right side bracket inward position or the right side bracket outward position, and to unlock and allow the right side bracket to move between the right side bracket inward position and the right side bracket outward position, and a left side bracket locking mechanism that may be selectively engageable to lock the left side bracket at the left side bracket inward position or the left side bracket outward position, and to unlock and allow the left side bracket to move between the left side bracket inward position and the left side bracket outward position. The right control pod and the left control pod may be spaced by a minimum control pod spacing distance when the right side bracket is in the right side bracket inward position and the left side bracket is in the left side bracket inward position, and the right control pod and the left control pod may be spaced by a maximum control pod spacing distance when the right side bracket is in the right side bracket outward position and the left side bracket is in the left side bracket outward position.

Additional aspects are defined by the claims of this patent.

DETAILED DESCRIPTION

Figure 1:
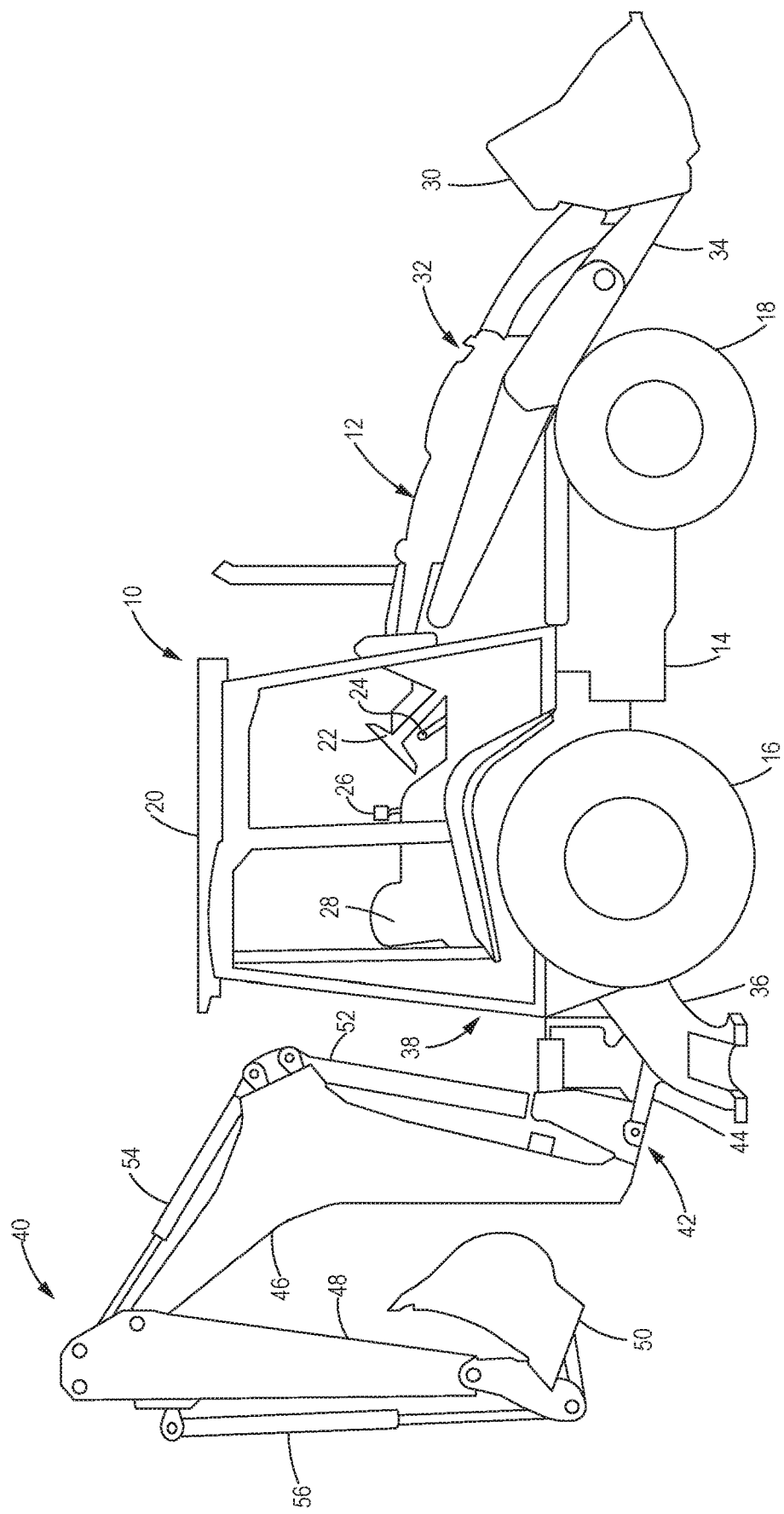
FIG. 1 is a side view of an exemplary work machine in which a control pod bracket assembly in accordance with the present disclosure may be implemented.

FIG. 1 illustrates an exemplary work machine 10 in the form of a backhoe loader in which an adjustable control pod bracket assembly in accordance with the present disclosure may be implemented. The work machine 10 may include a machine body 12 having a chassis 14. The machine body 12 may include ground engaging elements, such as a pair of rear wheels 16 and a pair of front wheels 18. It should be understood that, instead of wheels 16, 18, the machine body 12 could be provided with a pair of tracks or other structure to permit transportation of the work machine 10 over a work surface. The work machine 10 may also include an operator cab 20 or other suitable facilities to accommodate an operator (not shown). The operator cab 20 may include suitable controls for driving the work machine 10, such as a steering wheel 22 and a gear shift lever 24. The operator cab 20 may also have controls for controlling the operation of the implements of the work machine 10, such as joysticks 26 on control pods (not shown) mounted on an operator seat 28 that enable the operator to interface with a control system (not shown) of the work machine 10.

The work machine 10 may include a loader bucket 30 at a first end 32 of the machine body 12, and a suitable operating linkage 34 for manipulation of the loader bucket 30. The work machine 10 may further include a pair of outriggers or stabilizers 36 mounted adjacent a second end 38 of the machine body 12. The outriggers 36 may be hydraulically controlled in a relatively conventional manner to swing between a stored position and an extended position in which they contact the ground to stabilize the work machine 10 during operation of the implements.

The work machine 10 may also include an excavating assembly 40, for example, a backhoe mechanism, at the second end 38 of the machine body 12. The backhoe mechanism 40 may include a suitable swing assembly 42 for permitting the backhoe mechanism 40 to swing about a pivot from one side of the machine body 12 to the other. The swing assembly 42 may move under the control of one or more hydraulic cylinders 44, and may serve to move the backhoe mechanism 40 from an excavating position to a dumping position.

The backhoe mechanism 40 may include a boom 46 having a first end pivotally mounted adjacent the machine body 12 for movement in a generally vertical plane. A stick 48 may have a first end pivotally mounted adjacent a second end of the boom 46 for movement in the same generally vertical plane in which the boom 46 may move. An excavating implement in the form of a bucket 50 may be pivotally mounted at a second end of the stick 48 for pivotal movement in the same generally vertical plane in which the boom 46 and the stick 48 may move. The bucket 50 may be a relatively conventional backhoe bucket. The boom 46, the stick 48 and the bucket 50 may be pivotally moved under the control of hydraulic cylinders 52, 54, 56, respectively.

Figure 2:
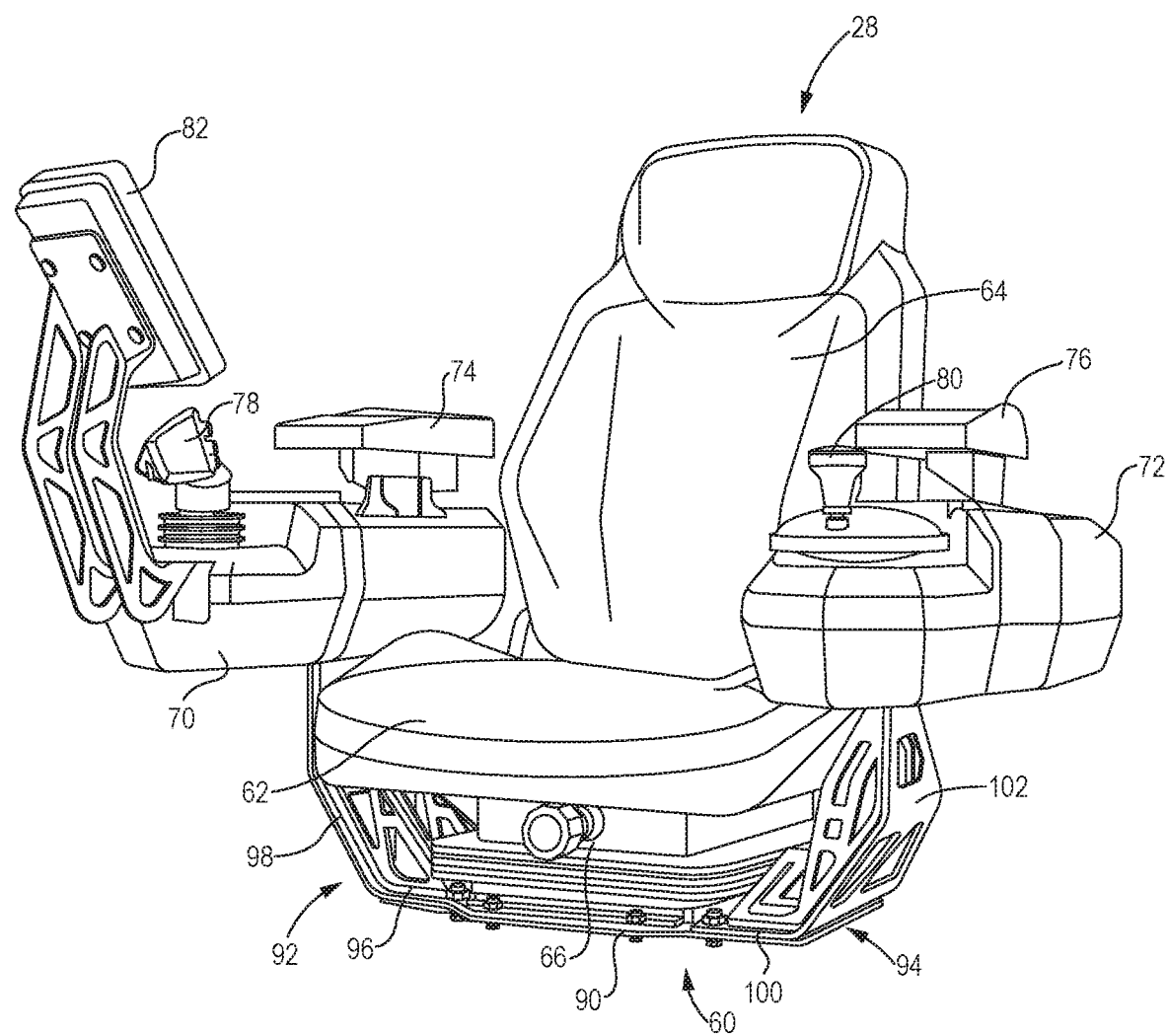
FIG. 2 is an isometric view of an operator seat of the work machine of FIG. 1 with a control pod bracket assembly in accordance with the present disclosure.

FIG. 2 illustrates an exemplary operator seat 28 for the work machine 10 that includes a control pod bracket assembly 60 in accordance with the present disclosure. The operator seat 28 may include a seat bottom 62 and a seat back 64 extending upward from a rear end of the seat bottom 62. The seat back 64 may be rigidly mounted to the seat bottom 62, or may be mounted in a manner that allows tilt adjustment, height adjustment and the like relative to the seat bottom 62 to set the seat back 64 at a comfortable position for the operator of the work machine 10. The operator seat 28 further includes a seat pedestal 66 beneath the seat bottom 62 for mounting the operator seat 28 to the machine body 12. The seat pedestal 66 may include mechanisms for height and tilt adjustment of the seat bottom 62 for the operator's comfort.

The operator seat 28 for the work machine 10 also includes control devices for the operator to manipulate while in the operator seat 28 to control the operation of the work machine 10, the loader bucket 30, the backhoe mechanism 40 or other implements and systems that may be implemented in the work machine 10. In the illustrated embodiment, the operator seat 28 includes a right control pod 70 and a left control pod 72 positioned on either side of the seat bottom 62 and the seat back 64. Each control pod 70, 72 may include a corresponding operator arm rest 74, 76, respectively, upon which the operator may rest their forearms while grasping and manipulating input mechanisms such as joysticks 78, 80, respectively. Alternative or additional input mechanisms may be integrated into the control pods 70, 72 as necessary to control the operation of the work machine 10. The control devices of the control pods 70, 72 may further include output devices such as a display monitor 82 that may provide the operator with information regarding the operation of the work machine 10, such as implement positions, cumulative material displaced, warning signals and the like. For full integration of the control devices, the control pods 70, 72, the seat bottom 62 and/or the seat pedestal 66 may be configured to accommodate routing of wires running from the control pods 70, 72 to components within the machine body 12, such as power sources, machine controllers, sensors and other components with which the control devices are integrated to operate the work machine 10.

The control pod bracket assembly 60 is configured to support the control pods 70, 72 on either side of the operator seat 28, and to allow adjustment of a separation distance between the control pods 70, 72 to accommodate operators of different sizes. The control pod bracket assembly 60 includes a center bracket 90, a right side bracket 92 and a left side bracket 94. The center bracket 90 may be installed between the seat pedestal 66 and the machine body 12, and may be wide enough to extend outward from the seat pedestal 66 to allow access to outer edges of the center bracket 90 for adjustments as discussed further below. The right side bracket 92 includes a generally planar and horizontal right bracket plate 96 that is attached to the center bracket 90 in the manner discussed below, and a right bracket support arm 98 that extends upward from the right bracket plate 96. The right bracket support arm 98 may extend above the seat bottom 62, with the right control pod 70 being mounted thereon for positioning the right control pod 70 adjacent to and above a right side of the seat bottom 62. The left side bracket 94 may generally be a mirror image of the right side bracket 92 and include a planar and horizontal left bracket plate 100 and an upwardly extending left bracket support arm 102 with the left control pod 72 mounted thereon and positioned adjacent to and above a left side of the seat bottom 62.

Figure 3:
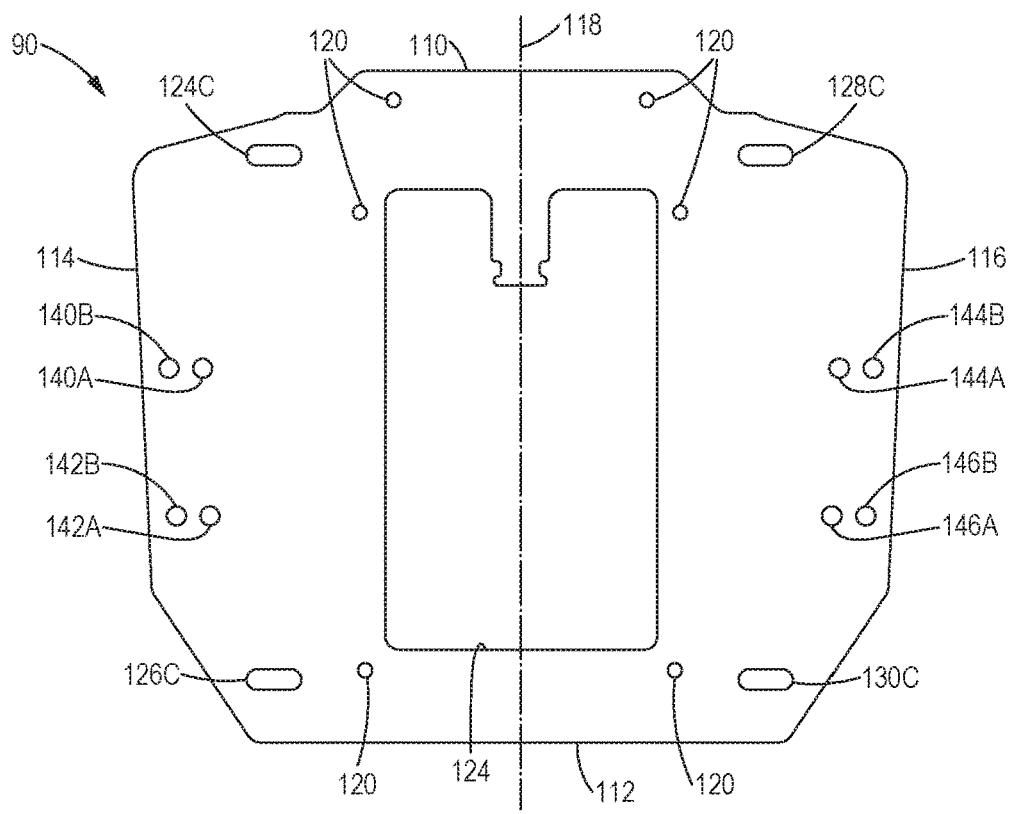
FIG. 3 is a bottom view of a center bracket of the control pod bracket assembly of FIG. 2.
Figure 4:
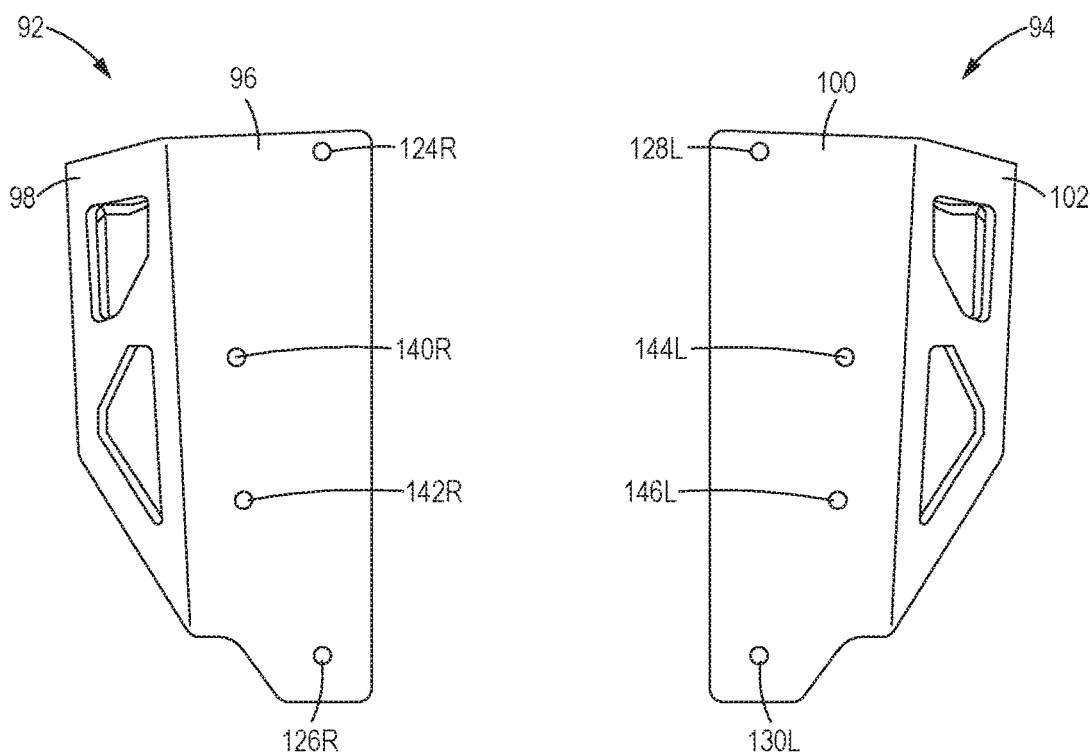
FIG. 4 is a bottom view of a right side bracket and a left side bracket of the control pod bracket assembly of FIG. 2.

The center bracket 90 and the side brackets 92, 94 are configured for adjustment of a distance between the bracket support arms 98, 102 and, correspondingly, a spacing distance between the control pods 70, 72. FIGS. 3 and 4 illustrate bottom views of the center bracket 90 and the side brackets 92, 94, respectively. Referring for FIG. 3, the center bracket 90 is generally planar and has a center bracket front edge 110 toward the front of the operator seat 28, a center bracket rear edge 112 at a rear end opposite the center bracket front edge 110, and a center bracket right edge 114 and a center bracket left edge 116 on opposite sides of the center bracket 90. A center bracket longitudinal axis 118 may extend between the center bracket front edge 110 and the center bracket rear edge 112 and bisect the center bracket 90. The center bracket 90 further has various openings defined therethrough for integration with the operator seat 28. Center bracket mounting holes 120 may be formed therethrough for reception of corresponding mounting hardware (not shown) for securing the seat pedestal 66 to the machine body 12 with the center bracket 90 disposed therebetween. A wiring opening 122 may be formed at a central location along the center bracket longitudinal axis 118 to allow wiring from the control pods 70, 72 to pass into the machine body 12.

Figure 7:
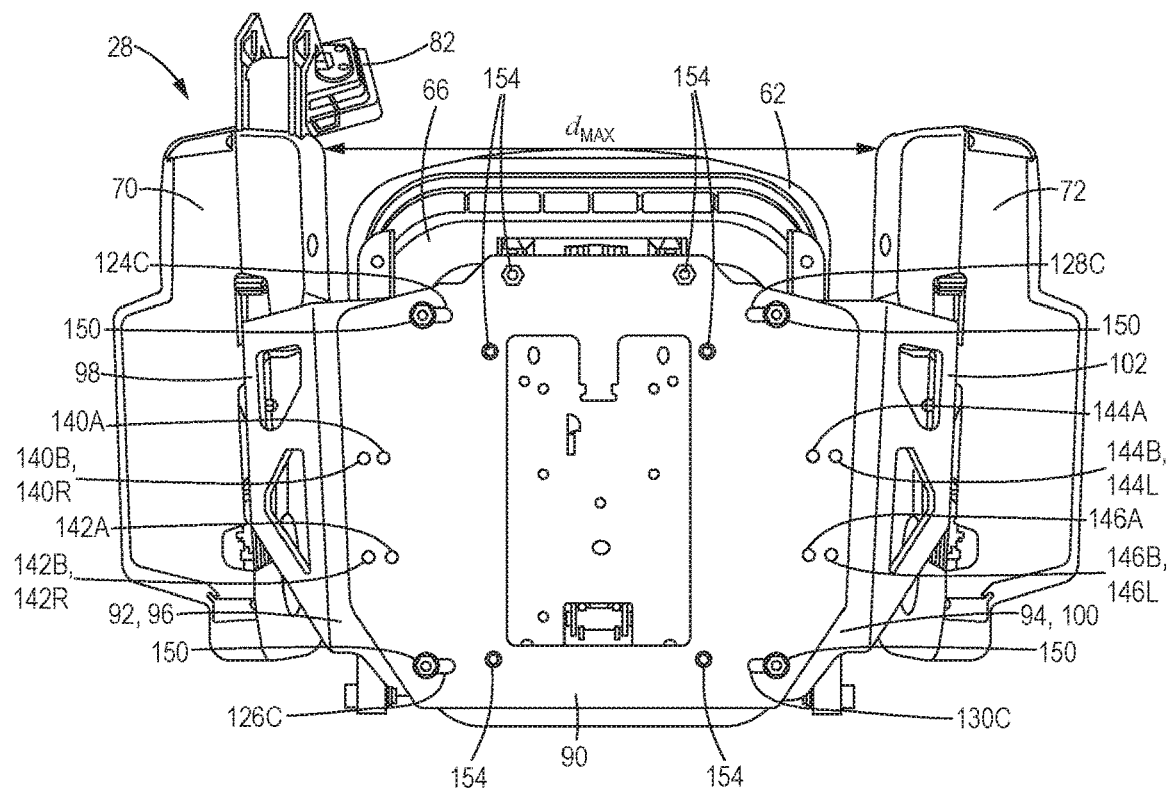
FIG. 7 is a bottom view of the operator seat and control pod bracket assembly of FIG. 5 with the side brackets and the control pods moved to a maximum control pod spacing distance.

As illustrated, the center bracket 90 further includes a front right bracket guide slot 124C and a rear right bracket guide slot 126C formed between the center bracket right edge 114 and the center bracket longitudinal axis 118. Similarly, a front left bracket guide slot 128C and a rear left bracket guide slot 130C may be formed between the center bracket left edge 116 and the center bracket longitudinal axis 118. The bracket guide slots, 124C, 126C, 128C, 130C are elongated in a transverse direction that is approximately perpendicular to the center bracket longitudinal axis 118. The transverse length of the bracket guide slots 124C, 126C, 128C, 130C will be determined in part based on a desired range or movement of the control pods 70, 72 between a minimum control pod spacing distance $d_{MIN}$ (FIG. 5) and a maximum control pod spacing distance $d_{MAX}$ (FIG. 7). While the bracket guide slots 124C, 126C, 128C, 130C as illustrated and described herein are generally perpendicular to the center bracket longitudinal axis 118 so that the control pods 70, 72 move generally perpendicular to the center bracket longitudinal axis 118, it is contemplated that the bracket guide slots 124C, 126C, 128C, 130C may be formed at an angle such that control pods 70, 72 also displace in the longitudinal direction as they move between the minimum control pod spacing distance $d_{MIN}$ and the maximum control pod spacing distance $d_{MAX}$, depending on the ergonomic needs for operators of particular work machines 10.

To retain the side brackets 92, 94 in set positions, the center bracket 90 also includes lock holes as parts of a right side bracket locking mechanism and a left side bracket locking mechanism for discrete positions of the side brackets 92, 94, respectively. Consequently, the center bracket 90 has front right bracket lock holes 140A, 140B, rear right bracket lock holes 142A, 142B, front left bracket lock holes 144A, 144B, and rear left bracket lock holes 146A, 146B.

Each pair of inner and outer bracket lock holes is aligned along a line parallel to the elongated length of the bracket guide slots 124C, 126C, 128C, 130C. The bracket inward lock holes 140A, 142A, 144A, 146A are located at positions corresponding to the minimum control pod spacing distance $d_{MIN}$, and the bracket outward lock holes 140B, 142B, 144B, 146B are located at positions corresponding to the maximum control pod spacing distance $d_{MAX}$. While the illustrated embodiment discloses two discrete positions for each of the side brackets 92, 94, those skilled in the art will understand that additional intermediate lock holes (not shown) may be provided between the inward and outward lock holes of each group of lock holes to provide additional discrete intermediate positions for the side brackets 92, 94 and control pods 70, 72 to provide greater flexibility in locating the control pods 70, 72 at comfortable positions for the operators of the work machine 10.

Turning to FIG. 4, the side brackets 92, 94 have openings in the bracket plates 96, 100 that correspond to the openings in the center bracket 90 for attachment and position adjustment of the side brackets 92, 94. The right side bracket 92 includes a front right bracket guide hole 124R and a rear right bracket guide hole 126R in the right bracket plate 96 having locations corresponding to the right bracket guide slots 124C, 124C, respectively. The left bracket plate 100 of the left side bracket 94 has a front left bracket guide hole 128L and a rear left bracket guide hole 130L having locations corresponding to the left bracket guide slots 128C, 130C. When the control pod bracket assembly 60 is installed, the bracket guide holes 124R, 126R, 128L, 130L are aligned with the bracket guide slots 124C, 126C, 128C, 130C, respectively, so that bracket guide bolts 150 (FIG. 5) can be inserted through the bracket guide slots 124C, 126C, 128C, 130C and screwed into the threaded bracket guide holes 124R, 126R, 128L, 130L.

A front right bracket lock hole 140R and a rear right bracket lock hole 142R extend through the right bracket plate 96, and a front left bracket lock hole 144L and a rear left bracket lock hole 146L extend through the left bracket plate 100. The bracket lock holes 140R, 142R, 144L, 146L are positioned to correspond to the bracket inward and outward lock holes 140A, 140B, 142A, 142B, 144A, 144B, 146A, 146B of the center bracket 90. Depending on the desired control pod spacing distance d between the control pods 70, 72, the bracket lock holes 140R, 142R are aligned with the bracket inward lock holes 140A, 142A or the bracket outward lock holes 140B, 142B, and the bracket lock holes 144L, 146L are aligned with the bracket inward lock holes 144A, 146A or the bracket outward lock holes 144B, 146B, so that bracket lock bolts 152 (FIG. 5) may be inserted and screwed into threads of the bracket lock holes 140R, 142R, 144L, 146L of the side brackets 92, 94.

Figure 5:
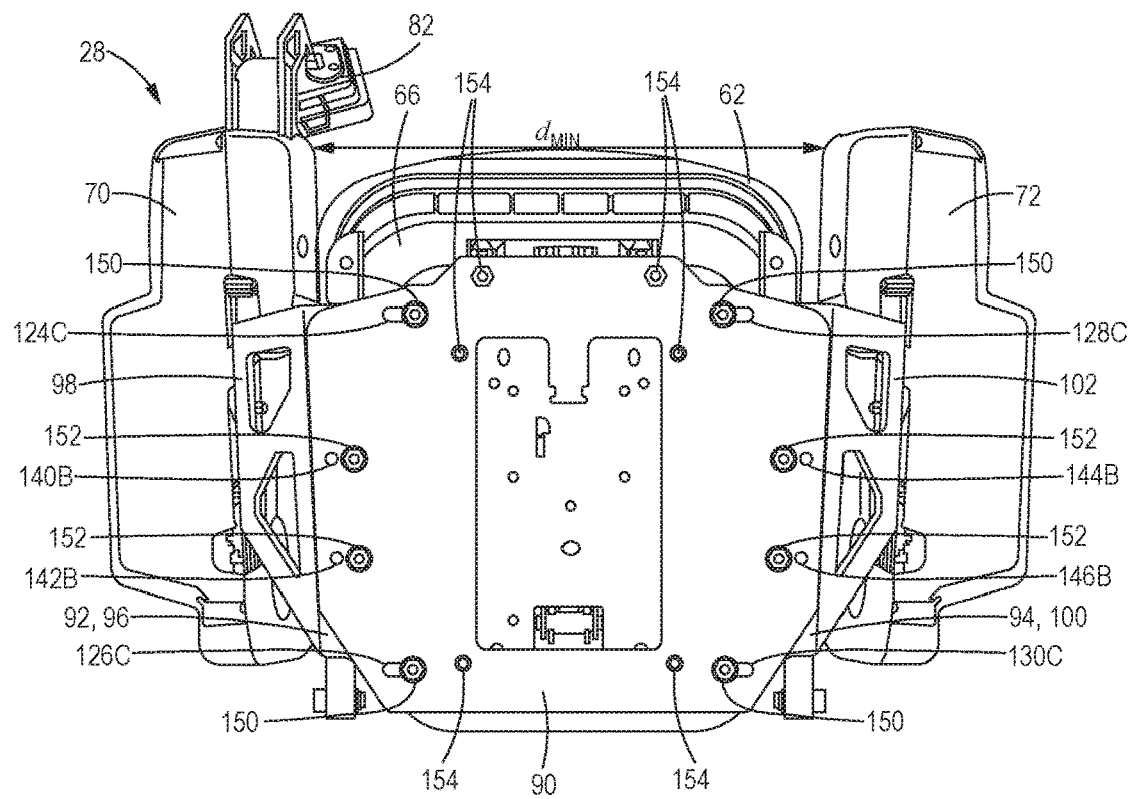
FIG. 5 is a bottom view of the operator seat and control pod bracket assembly of FIG. 2 with the control pod bracket assembly locked with the control pods at a minimum control pod spacing distance.

Turning to FIG. 5, the operator seat 28 and the control pod bracket assembly 60 are illustrated from the bottom with the side brackets 92, 94 at side bracket inward positions so that the control pods 70, 72 separated by the minimum control pod spacing distance $d_{MIN}$. The center bracket 90 is mounted to the seat pedestal 66 by center bracket mounting bolts 154 inserted through the center bracket mounting holes 120 (hidden by center bracket mounting bolts 154). Some of the center bracket mounting bolts 154 may extend into and engage the machine body 12 to secure the operator seat 28 within the operator cab 20. In alternative embodiments, other connection mechanisms may be implemented to secure the operator seat 28 and the control pod bracket assembly to the machine body 12. In the illustrated position, the side brackets 92, 94 are at their inward-most positions with the bracket guide bolts 150 proximate the inward ends of the bracket guide slots 124C, 126C, 128C, 130C. At the same time, the bracket lock bolts 152 are inserted through the bracket inward lock holes 140A, 142A, 144A, 146A and screwed into the bracket lock holes 140R, 142R, 144L, 146L to hold the side brackets 92, 94 and the control pods 70, 72 in fixed positions relative to the operator seat 28, to the center bracket 90, and to each other.

Figure 6:
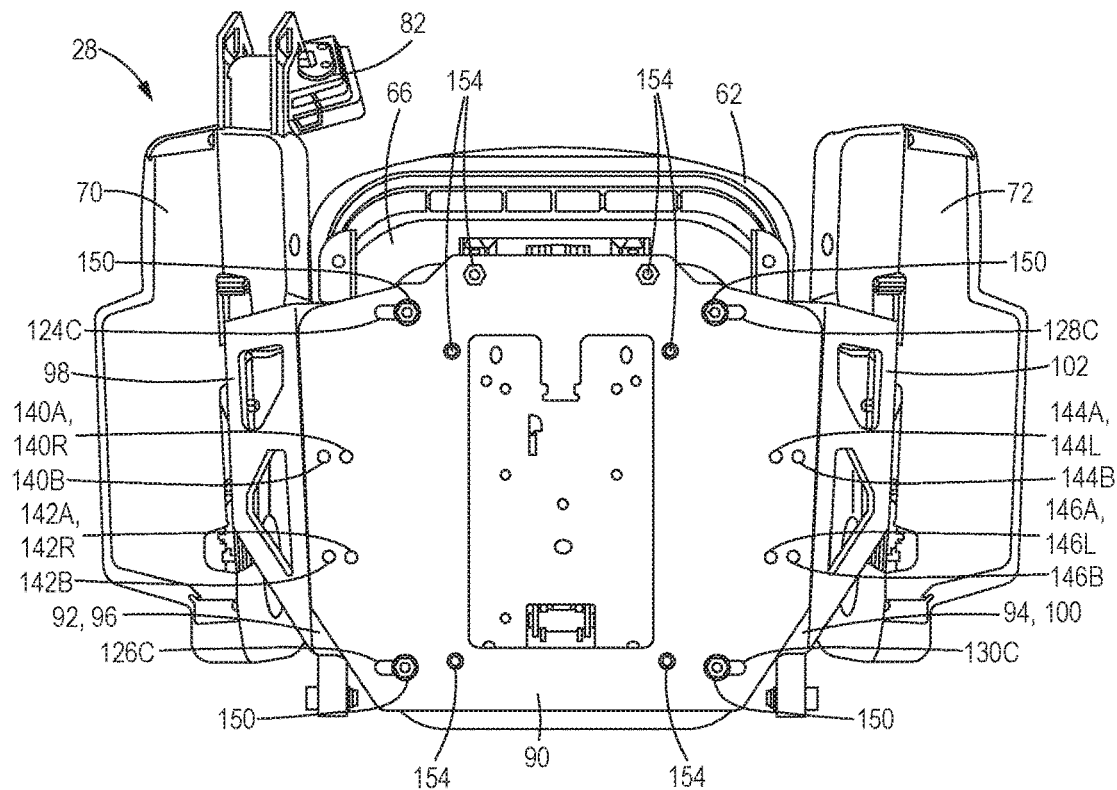
FIG. 6 is a bottom view of the operator seat and control pod bracket assembly of FIG. 5 with the control pod bracket assembly unlocked with the control pods at the minimum control pod spacing distance.
Figure 8:
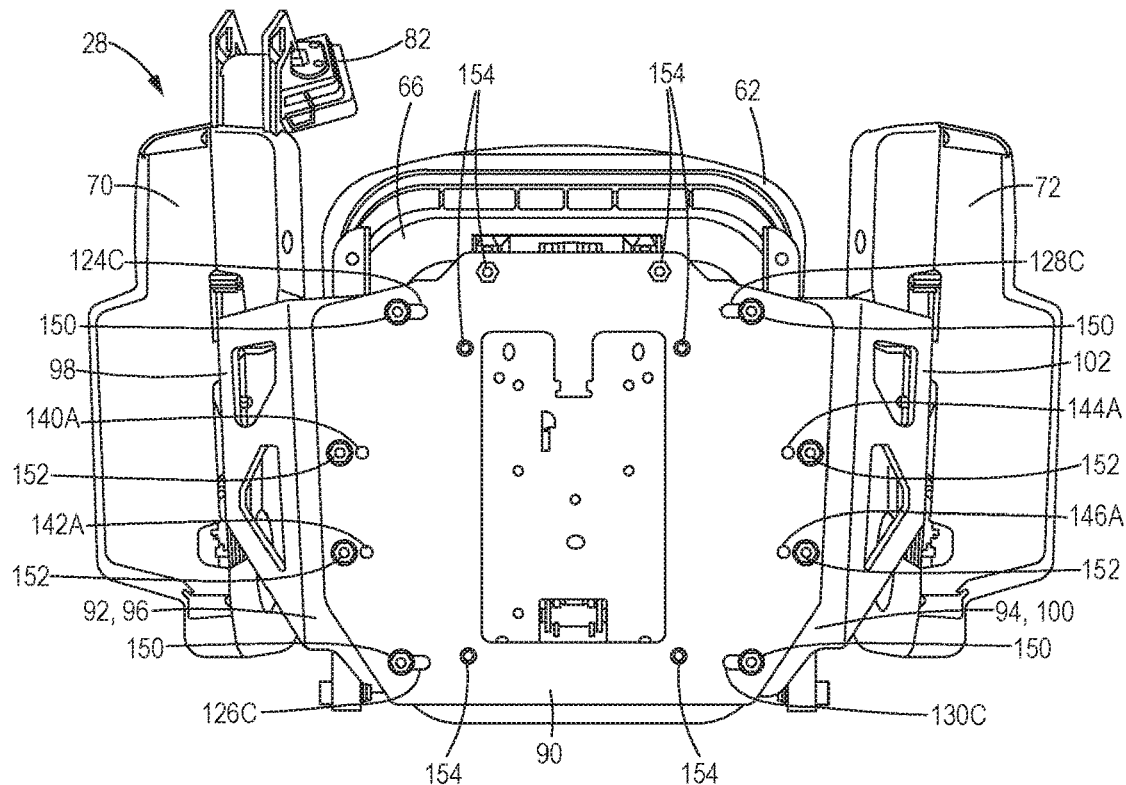
FIG. 8 is a bottom view of the operator seat and control pod bracket assembly of FIG. 5 with the side brackets and the control pods locked at the maximum control pod spacing distance.

Adjustment of the control pod spacing distance d is illustrated in the sequence of FIGS. 6-8. In FIG. 6, while the control pods 70, 72 are still at the minimum control pod spacing distance $d_{MIN}$, the bracket lock bolts 152 (not shown) are unscrewed from the bracket lock holes 140R, 142R, 144L, 146L and removed from the bracket inward lock holes 140A, 142A, 144A, 146A. In some embodiments, the bracket guide bolts 150 always provide spacing to allow sliding of the side brackets 92, 94 relative to the center bracket 90 when the bracket lock bolts 152 are removed. In other embodiments, the bracket guide bolts 150 are tightened to provide additional retention of the side brackets 92, 94 to the center bracket 90. In the latter embodiments, the bracket guide bolts 150 are also loosened to allow adjustment of the side brackets 92, 94. With the side brackets 92, 94 free to move subject to the constraints of the bracket guide slots 124C, 126C, 128C, 130C, the side brackets 92, 94 are moved outward until the bracket guide bolts 150 are proximate the outward ends of the bracket guide slots 124C, 126C, 128C, 130C and the bracket lock holes 140R, 142R, 144L, 146L are aligned with the bracket outward lock holes 140B, 142B, 144B, 146B as shown in FIG. 7. In these right and left side bracket outward positions, the control pods 70, 72 are separated by the maximum control pod spacing distance $d_{MAX}$. With the side brackets 92, 94 realigned to the outward position, the bracket lock bolts 152 may be inserted through the bracket outward lock holes 140B, 142B, 144B, 146B and screwed into the bracket lock holes 140R, 142R, 144L, 146L to fix the positions of the side brackets 92, 94 and the control pods 70, 72 as shown in FIG. 8. Depending on the embodiment, the bracket guide bolts 150 may be re-tightened to further secure the side brackets 92, 94 to the center bracket 90.

Figure 9:
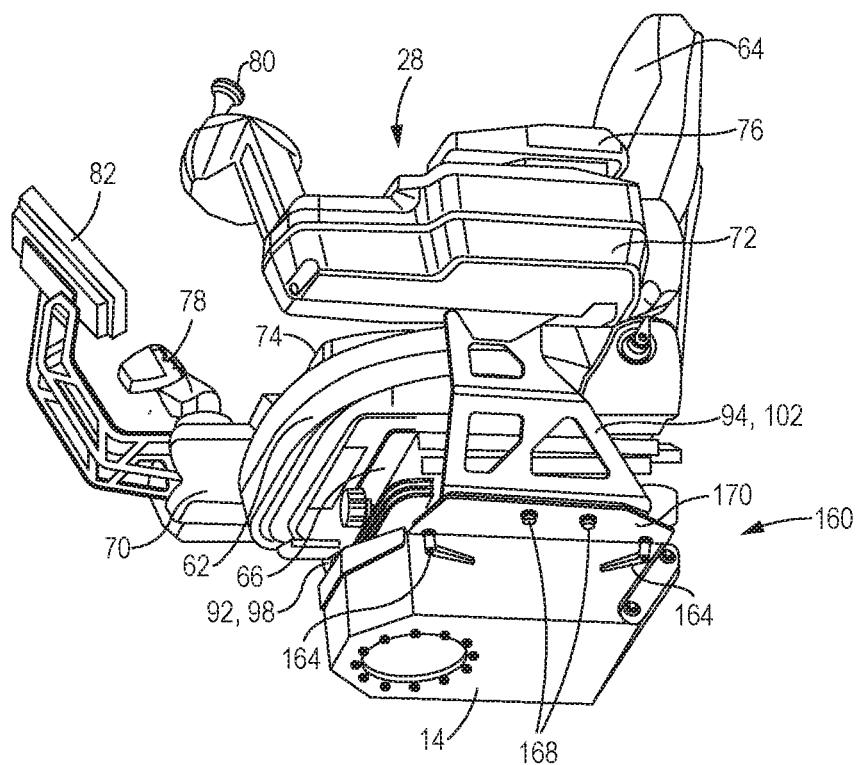
FIG. 9 is a bottom left isometric view of the operator seat of the work machine of FIG. 1 with an alternative embodiment of a control pod bracket assembly in accordance with the present disclosure.
Figure 10:
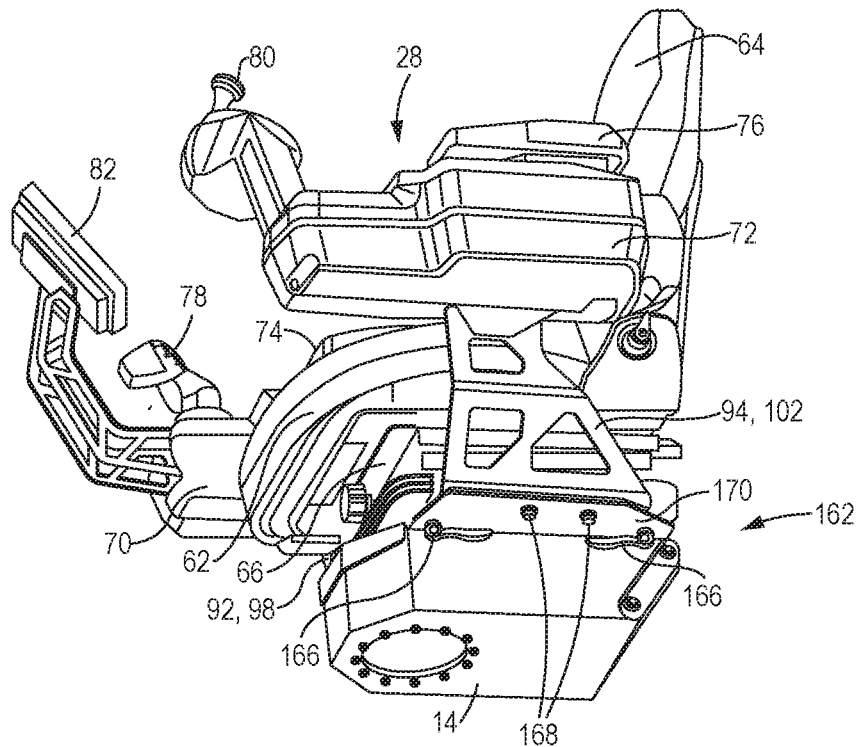
FIG. 10 is a bottom left isometric view of the operator seat of the work machine of FIG. 1 with a further alternative embodiment of a control pod bracket assembly in accordance with the present disclosure.

FIGS. 9 and 10 illustrate alternative embodiments of control pod bracket assemblies 160, 162 for the operator seat 28 that may not require tools or partial disassembly in order to adjust the control pod spacing distance d. Referring to FIG. 9, the control pod bracket assembly 160 may replace the bracket guide bolts 150 with adjustable handles 164 at the bracket guide slots 124C, 126C, 128C, 130C, and the bracket guide holes 124R, 126R, 128L, 130L, which in this embodiment function as lock slots and lock holes, to releasably engage a center bracket 170 and the side brackets 92, 94. Cam handles 166 are substituted in a similar manner in the control pod bracket assembly 162 as shown in FIG. 10. At the same time in both control pod bracket assemblies 160, 162, the bracket lock bolts 152 may be replaced by shoulder bolts 168, and the center bracket 170 may be modified to allow adjustments of the positions of the control pods 70, 72 without removing the shoulder bolts 168.

Figure 11:
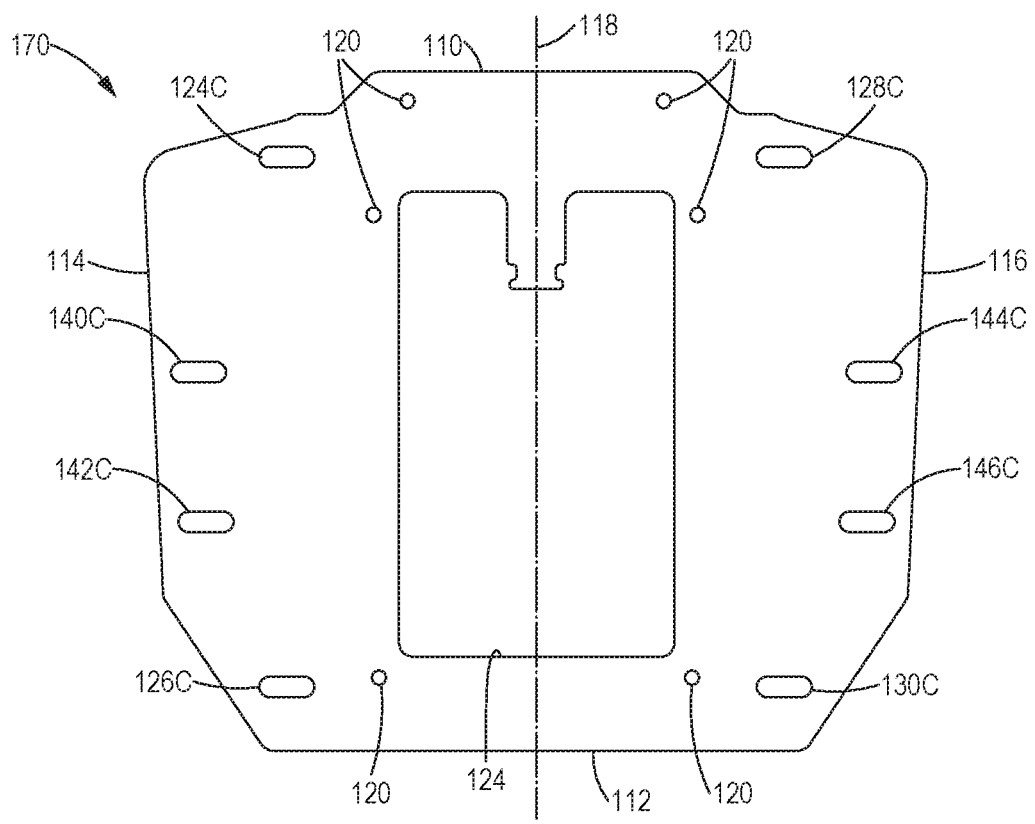
FIG. 11 is a bottom view of a center bracket of the control pod bracket assemblies of FIGS. 9 and 10.
Figure 12:
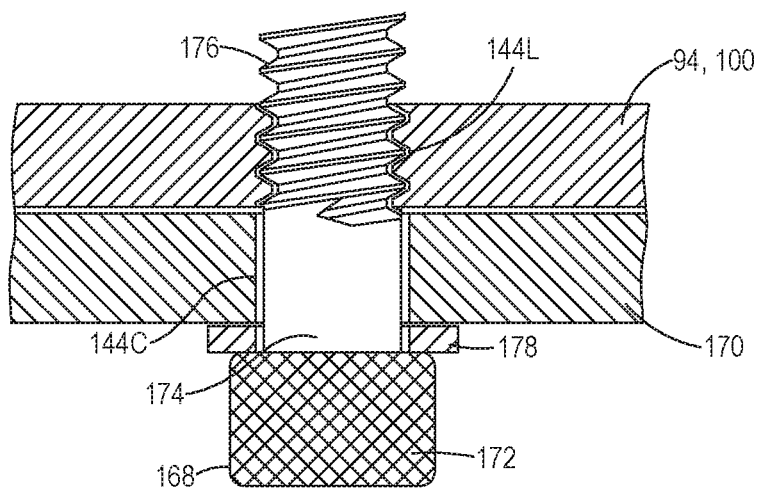
FIG. 12 is a partial cross-sectional view of the control pod bracket assemblies of FIGS. 9 and 10 illustrating a shoulder bolt in greater detail.

The center bracket 170 of the control pod bracket assemblies 160, 162 is illustrated in greater detail in FIG. 11. The center bracket 170 is generally similar to the center bracket 90 illustrated and described above, and similar elements are identified with the same reference numerals. The primary difference in the center bracket 170 is bracket guide slots 140C, 142C, 144C, 146C replacing the bracket lock holes 140A, 140B, 142A, 142B, 144A, 144B, 146A, 146B. With this modification, the bracket lock holes 140R, 142R, 144L, 146L will function as guide holes for the shoulder bolts 168 for positioning the side brackets 92, 94 during control pod adjustments. Referring to FIG. 12, the left bracket plate 100 and the center bracket 170 are shown in cross-section at an area proximate the front left bracket lock hole 144L in the front left bracket guide slot 144C when the control pod bracket assemblies 160, 162 are assembled. The following discussion applies equally to the other combinations of bracket lock holes and bracket guide slots. The shoulder bolt 168 may include a knurled bolt head 172, a cylindrical shank 174 and a threaded end 176 opposite the bolt head 172. The front left bracket lock hole 144L may have internal threads that mate with the external thread of the threaded end 176. The front left bracket guide slot 144C may have a width that is greater than the outer diameters of the shank 174 and the threaded end 176 so that the shoulder bolt 168 can screw to the left bracket plate 100 while allowing the shank 174 to slide within the front left bracket guide slot 144C as the relative positions of the center bracket 170 and the left side bracket 94 are adjusted. As illustrated, the shank 174 has an axial length that is greater than the combined thickness of the center bracket 170 and a washer 178 disposed thereon so that the operator does not have to loosen the shoulder bolts 68 each time the control pods 70, 72 are adjusted. In alternative embodiments, however, the shank 174 may be shorter so that a clamping force is applied when the shoulder bolts 168 are finger tightened or otherwise screwed down by the operator.

Figure 13:
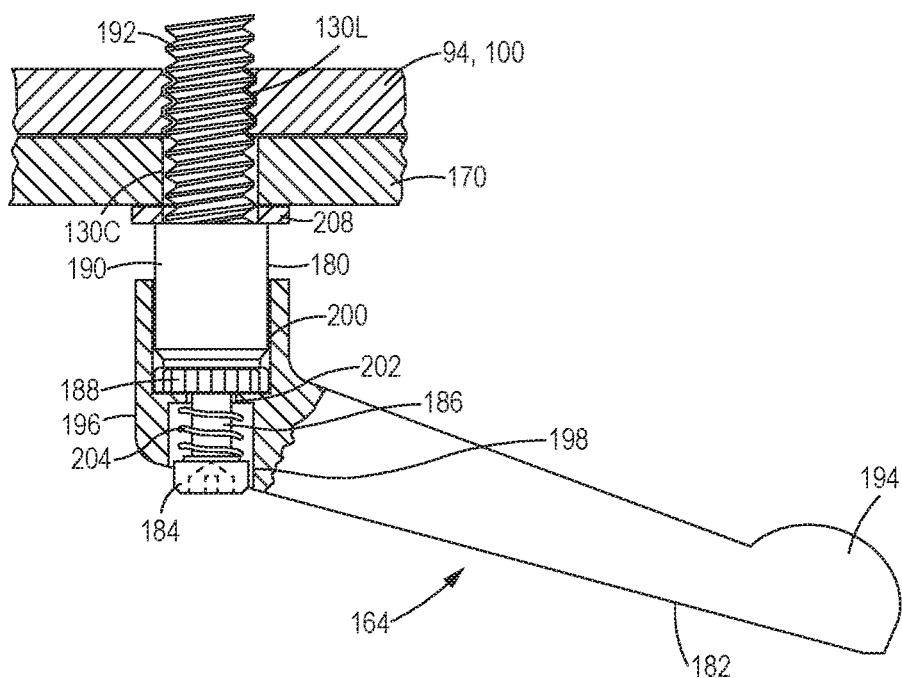
FIG. 13 is a partial cross-sectional view of the control pod bracket assembly of FIG. 9 illustrating an adjustable handle of the bracket locking mechanism in greater detail in a driving position.
Figure 14:
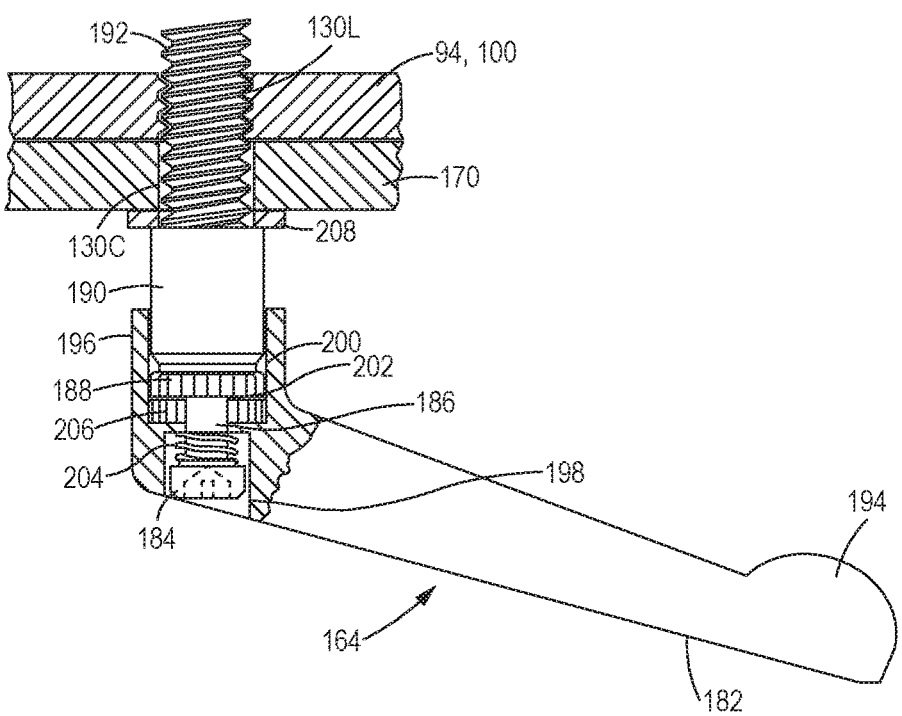
FIG. 14 is a partial cross-sectional view of the control pod bracket assembly of FIG. 9 illustrating the adjustable handle of the bracket locking mechanism in greater detail in a disengaged position.

The adjustable handles 164 and the cam handles 166 are releasable bracket locking mechanisms that can loosen the side brackets 92, 94 without requiring full removal in the same manner as the bracket lock bolts 152 in the control pod bracket assembly 60. The adjustable handles 164 are illustrated in greater detail in FIGS. 13 and 14. Referring to FIG. 13, the exemplary adjustable handle 164 of a bracket locking mechanism includes a screw 180 with a handle 182 mounted thereon. The screw 180 has a screw head 184 with a hex opening or other opening to receive a tool to turn the screw 180. A neck 186 extends from the screw head 184 to a spline 188 that has external teeth, then to a cylindrical shank 190, and terminates at a threaded end 192. The handle 182 includes a grip portion 194 and a body portion 196. The body portion 196 has a head cavity 198 and a shank cavity 200 separated by a neck opening 202. The neck 186 extends through the neck opening 202 so that a majority of the neck 186 and the screw head 184 are disposed in the head cavity 198, and the spline 188 and a majority of the shank 190 are disposed in the shank cavity 200. A spring 204 is disposed around the neck 186 and between the screw head 184 and an inner shoulder of the head cavity 198 to bias the spline 188 toward the head cavity 198 and into meshing engagement with an internal spline 206 (FIG. 14) of the shank cavity 200.

When the screw 180 is in the driving position shown in FIG. 13 with the splines 188, 206 meshing, the screw 180 will rotate with the handle 182 so that the threaded end 192 can be screwed into and out of the internal threads of the rear left bracket guide hole 130L. A width of the rear left bracket guide slot 130C is greater than an outer diameter of the threaded end 192 to allow the threaded end 192 to be insertable therethrough and slidable therein. The threaded end 192 is screwed into the rear left bracket guide hole 130L until the shank 190 compresses a washer 208 and the center bracket 170 to lock the position of the left side bracket 94 relative to the center bracket 170.

Due to the confined space beneath the operator seat 28, the handle 182 may not be able to rotate 360° about the screw 180 when the threaded end 192 is in the rear left bracket guide hole 130L. When the handle 182 reaches a rotational limit, the handle 182 may be moved to a disengaged position of FIG. 14 to disengage the splines 188 from the internal splines 206. The handle 182 is pulled toward the screw head 184 against a biasing force of the spring 204. With the splines 188, 206 disengaged, the handle 182 can freely rotate relative to the screw 180 back to a position where it can again be rotated to drive the screw 180 in the desired direction. Once in the new position, the handle 182 may be released so the spring 204 can force the body portion 196 toward the shank 190 to reengage the splines 188, 206 and lock the screw 180 for rotation with the handle 182.

Figure 15:
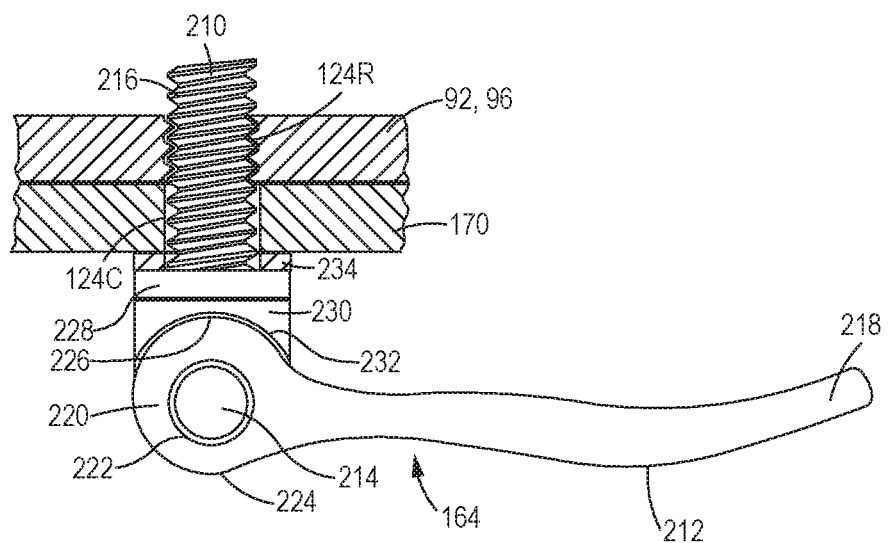
FIG. 15 is a partial cross-sectional view of the control pod bracket assembly of FIG. 10 illustrating a cam handle of the bracket locking mechanism in greater detail in a lock position.
Figure 16:
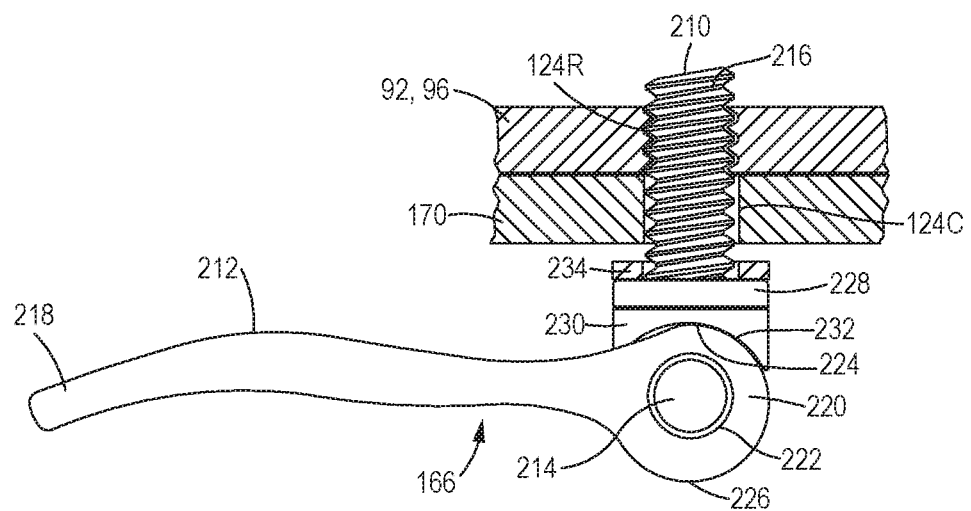
FIG. 16 is a partial cross-sectional view of the control pod bracket assembly of FIG. 9 illustrating the cam handle of the bracket locking mechanism in greater detail in an unlock position.

FIGS. 15 and 16 illustrate an exemplary embodiment of the cam handle 166 at the front right bracket guide/lock position of the front right bracket guide slot 124C and the front right bracket guide hole 124R, for example. The cam handle 166 is implemented in a similar manner at the other guide/lock positions of the control pod bracket assembly 162. The cam handle 166 includes a cam screw 210 and a handle 212 pivotally connected thereto by a shaft pin 214. The cam screw 210 has a threaded end 216 that is similar to the threaded end 192 of the screw 180 so that it may be inserted through the front right bracket guide slot 124C and screwed into the internal threads of the front right bracket guide hole 124R. The handle 212 includes a handle portion 218 and a cam portion 220. The cam portion 220 is generally circular and has a pin opening 222 through which the shaft pin 214 is inserted. The pin opening 222 is offset from a center of the cam portion 220 toward an unlock side 224 and away from a lock side 226.

A cam washer 228 and a cam bushing 230 are disposed on the cam screw 210 between the threaded end 216 and the cam portion 220 of the handle 212. The cam bushing 230 has a concave cam surface 232 that is shaped to correspond to the outer surface of the cam portion 220 of the handle 212. When the handle 212 is rotated to a locked position as shown in FIG. 15, the lock side 226 is received in the cam surface 232 of the cam bushing 230. Due to the distance between the shaft pin 214 and the lock side 226, the cam washer 228 and the cam bushing 230 compress a washer 234 to clamp the center bracket 170 between the washer 234 and the left bracket plate 100 to lock the right side bracket 92 in position. The cam handle 166 is unlocked by rotating the handle 212 to an unlocked position shown in FIG. 16 with the unlock side 224 disposed in the cam surface 232. The shorter distance between the unlock side 224 and the shaft pin 214 removes the clamping force on the center bracket 170 to allow the right side bracket 92 to move relative to the center bracket 170 and adjust the position of the control pod 70. After adjustment, the handle 212 is rotated back to the lock position of FIG. 15 to secure the right side bracket 92 in the adjusted position.

INDUSTRIAL APPLICABILITY

The control pod bracket assemblies 60, 160, 162 as illustrated and described herein allows the spacing distance d between the control pods 70, 72 to be adjusted based on an operator's body size and comfort. Depending on the requirements for a particular implementation, the control pod bracket assemblies 60, 160, 162 may be configured to move the control pods 70, 72 forward and reward relative to the operator seat 28 if necessary to place the control pods 70, 72 in comfortable and ergonomic positions for operation by operators of differing sizes. The control pod bracket assembly 60 in accordance with the present disclosure may have at least two discrete positions for the side brackets 92, 94 and the control pods 70, 72, and may have as may positions as necessary to accommodate anticipated body size variations of operators of the work machines 10. In the alternative embodiments of the control pod bracket assemblies 160, 162, the control pod bracket assemblies 160, 162 are not limited to discrete positions between maximum control pod spacing distance $d_{MAX}$ and the minimum control pod spacing distance $d_{MIN}$ of the control pods 70, 72, and instead allow infinite incremental adjustment of the spacing distance between the maximum and the minimum.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A control pod bracket assembly for an operator seat of a work machine, wherein the operator seat includes a right control pod and a left control pod, the control pod bracket assembly comprising:

a center bracket having a right bracket guide slot and a left bracket guide slot that are elongated in a transverse direction that is approximately perpendicular to a center bracket longitudinal axis that extends from a front edge of the center bracket to a rear edge of the center bracket;

a right side bracket including a right bracket guide hole and having the right control pod mounted thereon, wherein the right side bracket is slidably coupled to the center bracket to move between a right side bracket inward position and a right side bracket outward position;

a left side bracket including a left bracket guide hole and having the left control pod mounted thereon, wherein the left side bracket is slidably coupled to the center bracket to move between a left side bracket inward position and a left side bracket outward position;

a right bracket guide bolt that is inserted through the right bracket guide slot and engages the right side bracket at the right bracket guide hole so that the right bracket guide bolt is slidable in the transverse direction within the right bracket guide slot to allow the right side bracket to move between the right side bracket inward position and the right side bracket outward position;

a left bracket guide bolt that is inserted through the left bracket guide slot and engages the left side bracket at the left bracket guide hole so that the left bracket guide bolt is slidable in the transverse direction within the left bracket guide slot to allow the left side bracket to move between the left side bracket inward position and the left side bracket outward position;

a right side bracket locking mechanism that is selectively engageable to lock the right side bracket at the right side bracket inward position or the right side bracket outward position, and to unlock and allow the right side bracket to move between the right side bracket inward position and the right side bracket outward position; and a left side bracket locking mechanism that is selectively engageable to lock the left side bracket at the left side bracket inward position or the left side bracket outward position, and to unlock and allow the left side bracket to move between the left side bracket inward position and the left side bracket outward position, wherein the right control pod and the left control pod are spaced by a minimum control pod spacing distance when the right side bracket is in the right side bracket inward position and the left side bracket is in the left side bracket inward position, and wherein the right control pod and the left control pod are spaced by a maximum control pod spacing distance when the right side bracket is in the right side bracket outward position and the left side bracket is in the left side bracket outward position.

2. The control pod bracket assembly of claim 1, wherein the right bracket guide bolt and the left bracket guide bolt are tightened to prevent relative movement between the center bracket and the right side bracket, and the center bracket and the left side bracket, respectively, and wherein the right bracket guide bolt and the left bracket guide bolt are loosened to allow relative movement between the center bracket and the right side bracket, and the center bracket and the left side bracket, respectively.

3. The control pod bracket assembly of claim 1, wherein the right bracket guide slot, the right bracket guide hole, the left bracket guide slot and the left bracket guide hole are disposed proximate the front edge of the center bracket when the control pod bracket assembly is assembled, wherein the center bracket includes a rear right bracket guide slot and a rear left bracket guide slot located proximate the rear edge and that are elongated in the transverse direction, wherein the right side bracket includes a rear right bracket guide hole and the left side bracket includes a rear left bracket guide hole that are disposed proximate the rear edge of the center bracket when the control pod bracket assembly is assembled, and wherein the control pod bracket assembly comprises:

a rear right bracket guide bolt that is inserted through the rear right bracket guide slot and engages the right side bracket at the rear right bracket guide hole so that the rear right bracket guide bolt is slidable within the rear right bracket guide slot to allow the right side bracket to move between the right side bracket inward position and the right side bracket outward position; and a rear left bracket guide bolt that is inserted through the rear left bracket guide slot and engages the left side bracket at the rear left bracket guide hole so that the rear left bracket guide bolt is slidable within the rear left bracket guide slot to allow the left side bracket to move between the left side bracket inward position and the left side bracket outward position.

4. The control pod bracket assembly of claim 1, wherein the right side bracket locking mechanism comprises:

a right bracket inward lock hole defined through the center bracket between a center bracket right edge and a center bracket longitudinal axis that extends from a front edge of the center bracket to a rear edge of the center bracket;

a right bracket outward lock hole defined through the center bracket between the right bracket inward lock hole and the center bracket right edge;

a right bracket lock hole defined through the right side bracket; and a right bracket lock bolt, wherein the right side bracket is locked at the right side bracket inward position when the right bracket lock hole is aligned with the right bracket inward lock hole and the right bracket lock bolt is inserted through the right bracket inward lock hole and engages the right side bracket at the right bracket lock hole, and wherein the right side bracket is locked at the right side bracket outward position when the right bracket lock hole is aligned with the right bracket outward lock hole and the right bracket lock bolt is inserted through the right bracket outward lock hole and engages the right side bracket at the right bracket lock hole; and wherein the left side bracket locking mechanism comprises:

a left bracket inward lock hole defined through the center bracket between the center bracket longitudinal axis and a center bracket left edge;

a left bracket outward lock hole defined through the center bracket between the left bracket inward lock hole and the center bracket left edge;

a left bracket lock hole defined through the left side bracket; and a left bracket lock bolt, wherein the left side bracket is locked at the left side bracket inward position when the left bracket lock hole is aligned with the left bracket inward lock hole and the left bracket lock bolt is inserted through the left bracket inward lock hole and engages the left side bracket at the left bracket lock hole, and wherein the left side bracket is locked at the left side bracket outward position when the left bracket lock hole is aligned with the left bracket outward lock hole and the left bracket lock bolt is inserted through the left bracket outward lock hole and engages the left side bracket at the left bracket lock hole.

5. The control pod bracket assembly of claim 4, wherein the right side bracket locking mechanism comprises a right bracket intermediate lock hole defined through the center bracket between the right bracket inward lock hole and the right bracket outward lock hole, wherein the right side bracket is locked at a right side bracket intermediate position when the right bracket lock hole is aligned with the right bracket intermediate lock hole and the right bracket lock bolt is inserted through the right bracket intermediate lock hole and engages the right side bracket at the right bracket lock hole, wherein the left side bracket locking mechanism comprises a left bracket intermediate lock hole defined through the center bracket between the left bracket inward lock hole and the left bracket outward lock hole, and wherein the left side bracket is locked at a left side bracket intermediate position when the left bracket lock hole is aligned with the left bracket intermediate lock hole and the left bracket lock bolt is inserted through the left bracket intermediate lock hole and engages the left side bracket at the right bracket lock hole.

6. The control pod bracket assembly of claim 1, wherein the right side bracket locking mechanism comprises an adjustable right handle comprising:

a right screw having a threaded end inserted through the right bracket guide slot and screwed into the right bracket guide hole, and a right handle coupled to the right screw, the right handle having a drive position wherein the right handle engages the right screw so that rotation of the right handle causes rotation of the right screw and a disengaged position wherein rotation of the right handle does not cause rotation of the right screw, and wherein the left side bracket locking mechanism comprises an adjustable left handle comprising:

a left screw having a threaded end inserted through the left bracket guide slot and screwed into the left bracket guide hole, and a left handle coupled to the left screw, the left handle having a drive position wherein the left handle engages the left screw so that rotation of the left handle causes rotation of the left screw and a disengaged position wherein rotation of the left handle does not cause rotation of the left screw.

7. The control pod bracket assembly of claim 1, wherein the right side bracket locking mechanism comprises a right cam handle comprising:

a right cam screw having a threaded end inserted through the right bracket guide slot and screwed into the right bracket guide hole, a right handle coupled to the right cam screw and rotatable about an axis that is perpendicular to a rotational axis of the right cam screw, and a right cam bushing disposed on the right cam screw between the threaded end and the right handle, wherein the right handle is rotatable between a lock position where the right handle engages the right cam bushing to create a clamping force between the center bracket and the right side bracket and an unlock position where the right handle does not create the clamping force between the center bracket and the right side bracket, and wherein the left side bracket locking mechanism comprises a left cam handle comprising:

a left cam screw having a threaded end inserted through the left bracket guide slot and screwed into the left bracket guide hole, a left handle coupled to the left cam screw and rotatable about an axis that is perpendicular to a rotational axis of the left cam screw, and a left cam bushing disposed on the left cam screw between the threaded end and the left handle, wherein the left handle is rotatable between a lock position where the left handle engages the left cam bushing to create a clamping force between the center bracket and the left side bracket and an unlock position where the left handle does not create the clamping force between the center bracket and the left side bracket.

8. A method for adjusting a control pod spacing distance between a right control pod and a left control pod of an operator seat of a work machine, wherein the right control pod and the left control pod are mounted on a right side bracket and a left side bracket, respectively of a control pod bracket assembly, and the right side bracket and the left side bracket are slidably coupled to a center bracket of the control pod bracket assembly, wherein the center bracket includes a right bracket guide slot and a left bracket guide slot that are elongated in a transverse direction that is approximately perpendicular to a center bracket longitudinal axis of the center bracket, wherein the right side bracket includes a right bracket guide hole and the left side bracket includes a left bracket guide hole, wherein a right bracket guide bolt is inserted through the right bracket guide slot and engages the right side bracket at the right bracket guide hole, wherein a left bracket guide bolt is inserted through the left bracket guide slot and engages the left side bracket at the left bracket guide hole, the method for adjusting the control pod spacing distance comprising:

disengaging a right side bracket locking mechanism and a left side bracket locking mechanism;

moving the right side bracket from a right side bracket first position to a right side bracket second position by moving the right side bracket relative to the center bracket to slide the right bracket guide bolt in the transverse direction from a right bracket guide slot first end to a right bracket guide slot second end;

moving the left side bracket from a left side bracket first position to a left side bracket second position by moving the left side bracket relative to the center bracket to slide the left bracket guide bolt in the transverse direction from a left bracket guide slot first end to a left bracket guide slot second end; and engaging the right side bracket locking mechanism and the left side bracket locking mechanism.

9. The method for adjusting of claim 8, wherein the right bracket guide bolt and the left bracket guide bolt are tightened to prevent relative movement between the center bracket and the right side bracket, and the center bracket and the left side bracket, respectively, wherein moving the right side bracket comprises loosening the right bracket guide bolt before sliding the right bracket guide bolt in the right bracket guide slot and tightening the right bracket guide bolt after sliding the right bracket guide bolt in the right bracket guide slot, and wherein moving the left side bracket comprises loosening the left bracket guide bolt before sliding the left bracket guide bolt in the left bracket guide slot and tightening the left bracket guide bolt after sliding the left bracket guide bolt in the left bracket guide slot.

10. The method for adjusting of claim 8, wherein the right bracket guide slot, the right bracket guide hole, the left bracket guide slot and the left bracket guide hole are disposed proximate a front edge of the center bracket when the control pod bracket assembly is assembled, wherein the center bracket includes a rear right bracket guide slot and a rear left bracket guide slot that are elongated in the transverse direction, wherein the right side bracket includes a rear right bracket guide hole and the left side bracket includes a rear left bracket guide hole, wherein a rear right bracket guide bolt is inserted through the rear right bracket guide slot and engages the right side bracket at the rear right bracket guide hole, wherein a rear left bracket guide bolt is inserted through the rear left bracket guide slot and engages the left side bracket at the rear left bracket guide hole, wherein moving the right side bracket comprises moving the right side bracket relative to the center bracket to slide the rear right bracket guide bolt from a rear right bracket guide slot first end to a rear right bracket guide slot second end, and wherein moving the left side bracket comprises moving the left side bracket relative to the center bracket to slide the rear left bracket guide bolt from a rear left bracket guide slot first end to a rear left bracket guide slot second end.

11. The method for adjusting of claim 8, wherein the right side bracket locking mechanism includes a right bracket inward lock hole defined through the center bracket between a center bracket right edge and a center bracket longitudinal axis, a right bracket outward lock hole defined through the center bracket between the right bracket inward lock hole and the center bracket right edge, a right bracket lock hole defined through the right side bracket, and a right bracket lock bolt, wherein the left side bracket locking mechanism includes a left bracket inward lock hole defined through the center bracket between a center bracket left edge and the center bracket longitudinal axis, a left bracket outward lock hole defined through the center bracket between the left bracket inward lock hole and the center bracket left edge, a left bracket lock hole defined through the left side bracket, and a left bracket lock bolt, wherein disengaging the right side bracket locking mechanism and the left side bracket locking mechanism comprises disengaging the right bracket lock bolt from the right bracket lock hole and removing the right bracket lock bolt from the right bracket inward lock hole, and disengaging the left bracket lock bolt from the left bracket lock hole and removing the left bracket lock bolt from the left bracket inward lock hole, and wherein engaging the right side bracket locking mechanism and the left side bracket locking mechanism comprises inserting the right bracket lock bolt through the right bracket outward lock hole and engaging the right bracket lock hole with the right bracket lock bolt, and inserting the left bracket lock bolt through the left bracket outward lock hole and engaging the left bracket lock hole with the left bracket lock bolt.

12. The method for adjusting of claim 11, wherein the right side bracket locking mechanism includes a rear right bracket inward lock hole defined through the center bracket between the center bracket right edge and the center bracket longitudinal axis and between the right bracket inward lock hole and a rear edge of the center bracket, a rear right bracket outward lock hole defined through the center bracket between the right bracket inward lock hole and the center bracket right edge and between the right bracket outward lock hole and the rear edge, a rear right bracket lock hole defined through the right side bracket and positioned to correspond to positions of the rear right bracket inward lock hole and the rear right bracket outward lock hole, and a rear right bracket lock bolt, wherein the left side bracket locking mechanism includes a rear left bracket inward lock hole defined through the center bracket between the center bracket left edge and the center bracket longitudinal axis and between the left bracket inward lock hole and the rear edge, a rear left bracket outward lock hole defined through the center bracket between the left bracket inward lock hole and the center bracket left edge and between the left bracket outward lock hole and the rear edge, a rear left bracket lock hole defined through the left side bracket and positioned to correspond to positions of the rear left bracket inward lock hole and the rear left bracket outward lock hole, and a rear left bracket lock bolt, wherein disengaging the right side bracket locking mechanism and the left side bracket locking mechanism comprises disengaging the rear right bracket lock bolt from the rear right bracket lock hole and removing the rear right bracket lock bolt from the rear right bracket inward lock hole, and disengaging the rear left bracket lock bolt from the rear left bracket lock hole and removing the rear left bracket lock bolt from the rear left bracket inward lock hole, and wherein engaging the right side bracket locking mechanism and the left side bracket locking mechanism comprises inserting the rear right bracket lock bolt through the rear right bracket outward lock hole and engaging the rear right bracket lock hole with the rear right bracket lock bolt, and inserting the rear left bracket lock bolt through the rear left bracket outward lock hole and engaging the rear left bracket lock hole with the rear left bracket lock bolt.

13. An operator seat for a work machine comprising:
a seat bottom;

a right control pod;
a left control pod; and
a control pod bracket assembly comprising:
- a center bracket mounted beneath the seat bottom and including a right bracket guide slot and a left bracket guide slot that are elongated in a transverse direction that is approximately perpendicular to a center bracket longitudinal axis that extends from a front edge of the center bracket to a rear edge of the center bracket,
- a right side bracket including a right bracket guide hole and having the right control pod mounted thereon, wherein the right side bracket is slidably coupled to the center bracket to move between a right side bracket inward position and a right side bracket outward position, and wherein the right control pod is positioned above and to the right of the seat bottom,
- a left side bracket including a left bracket guide hole and having the left control pod mounted thereon, wherein the left side bracket is slidably coupled to the center bracket to move between a left side bracket inward position and a left side bracket outward position, and wherein the left control pod is positioned above and to the left of the seat bottom,
- a right bracket guide bolt that is inserted through the right bracket guide slot and engages the right side bracket at the right bracket guide hole so that the right bracket guide bolt is slidable in the transverse direction within the right bracket guide slot to allow the right side bracket to move between the right side bracket inward position and the right side bracket outward position,
- a left bracket guide bolt that is inserted through the left bracket guide slot and engages the left side bracket at the left bracket guide hole so that the left bracket guide bolt is slidable in the transverse direction within the left bracket guide slot to allow the left side bracket to move between the left side bracket inward position and the left side bracket outward position,
- a right side bracket locking mechanism that is selectively engageable to lock the right side bracket at the right side bracket inward position or the right side bracket outward position, and to unlock and allow the right side bracket to move between the right side bracket inward position and the right side bracket outward position, and
- a left side bracket locking mechanism that is selectively engageable to lock the left side bracket at the left side bracket inward position or the left side bracket outward position, and to unlock and allow the left side bracket to move between the left side bracket inward position and the left side bracket outward position,
- wherein the right control pod and the left control pod are spaced by a minimum control pod spacing distance when the right side bracket is in the right side bracket inward position and the left side bracket is in the left side bracket inward position, and wherein the right control pod and the left control pod are spaced by a maximum control pod spacing distance when the right side bracket is in the right side bracket outward position and the left side bracket is in the left side bracket outward position.

14. The operator seat of claim 13, wherein the right bracket guide bolt and the left bracket guide bolt are tightened to prevent relative movement between the center bracket and the right side bracket, and the center bracket and the left side bracket, respectively, and wherein the right bracket guide bolt and the left bracket guide bolt are loosened to allow relative movement between the center bracket and the right side bracket, and the center bracket and the left side bracket, respectively.

15. The operator seat of claim 13, wherein the right bracket guide slot, the right bracket guide hole, the left bracket guide slot and the left bracket guide hole are disposed proximate the front edge of the center bracket when the control pod bracket assembly is assembled, wherein the center bracket includes a rear right bracket guide slot and a rear left bracket guide slot located proximate the rear edge and that are elongated in the transverse direction, wherein the right side bracket includes a rear right bracket guide hole and the left side bracket includes a rear left bracket guide hole that are disposed proximate the rear edge of the center bracket when the control pod bracket assembly is assembled, and wherein the control pod bracket assembly comprises:
- a rear right bracket guide bolt that is inserted through the rear right bracket guide slot and engages the right side bracket at the rear right bracket guide hole so that the rear right bracket guide bolt is slidable within the rear right bracket guide slot to allow the right side bracket to move between the right side bracket inward position and the right side bracket outward position; and
- a rear left bracket guide bolt that is inserted through the rear left bracket guide slot and engages the left side bracket at the rear left bracket guide hole so that the rear left bracket guide bolt is slidable within the rear left bracket guide slot to allow the left side bracket to move between the left side bracket inward position and the left side bracket outward position.

16. The operator seat of claim 13, wherein the right side bracket locking mechanism comprises:
- a right bracket inward lock hole defined through the center bracket between a center bracket right edge and a center bracket longitudinal axis that extends from a front edge of the center bracket to a rear edge of the center bracket;
- a right bracket outward lock hole defined through the center bracket between the right bracket inward lock hole and the center bracket right edge;
- a right bracket lock hole defined through the right side bracket; and
- a right bracket lock bolt, wherein the right side bracket is locked at the right side bracket inward position when the right bracket lock hole is aligned with the right bracket inward lock hole and the right bracket lock bolt is inserted through the right bracket inward lock hole and engages the right side bracket at the right bracket lock hole, and wherein the right side bracket is locked at the right side bracket outward position when the right bracket lock hole is aligned with the right bracket outward lock hole and the right bracket lock bolt is inserted through the right bracket outward lock hole and engages the right side bracket at the right bracket lock hole; and wherein the left side bracket locking mechanism comprises:
- a left bracket inward lock hole defined through the center bracket between the center bracket longitudinal axis and a center bracket left edge;
- a left bracket outward lock hole defined through the center bracket between the left bracket inward lock hole and the center bracket left edge;

a left bracket lock hole defined through the left side bracket; and a left bracket lock bolt, wherein the left side bracket is locked at the left side bracket inward position when the left bracket lock hole is aligned with the left bracket inward lock hole and the left bracket lock bolt is inserted through the left bracket inward lock hole and engages the left side bracket at the left bracket lock hole, and wherein the left side bracket is locked at the left side bracket outward position when the left bracket lock hole is aligned with the left bracket outward lock hole and the left bracket lock bolt is inserted through the left bracket outward lock hole and engages the left side bracket at the left bracket lock hole.

17. The operator seat of claim 16, wherein the right side bracket locking mechanism comprises a right bracket intermediate lock hole defined through the center bracket between the right bracket inward lock hole and the right bracket outward lock hole, wherein the right side bracket is locked at a right side bracket intermediate position when the right bracket lock hole is aligned with the right bracket intermediate lock hole and the right bracket lock bolt is inserted through the right bracket intermediate lock hole and engages the right side bracket at the right bracket lock hole, wherein the left side bracket locking mechanism comprises a left bracket intermediate lock hole defined through the center bracket between the left bracket inward lock hole and the left bracket outward lock hole, and wherein the left side bracket is locked at a left side bracket intermediate position when the left bracket lock hole is aligned with the left bracket intermediate lock hole and the left bracket lock bolt is inserted through the left bracket intermediate lock hole and engages the left side bracket at the right bracket lock hole.

\* \* \* \* \*